March 20, 1934.  W. B. GREEN  1,951,729
COMBINED LIGHT AND REFLECTOR
Filed Nov. 10, 1931
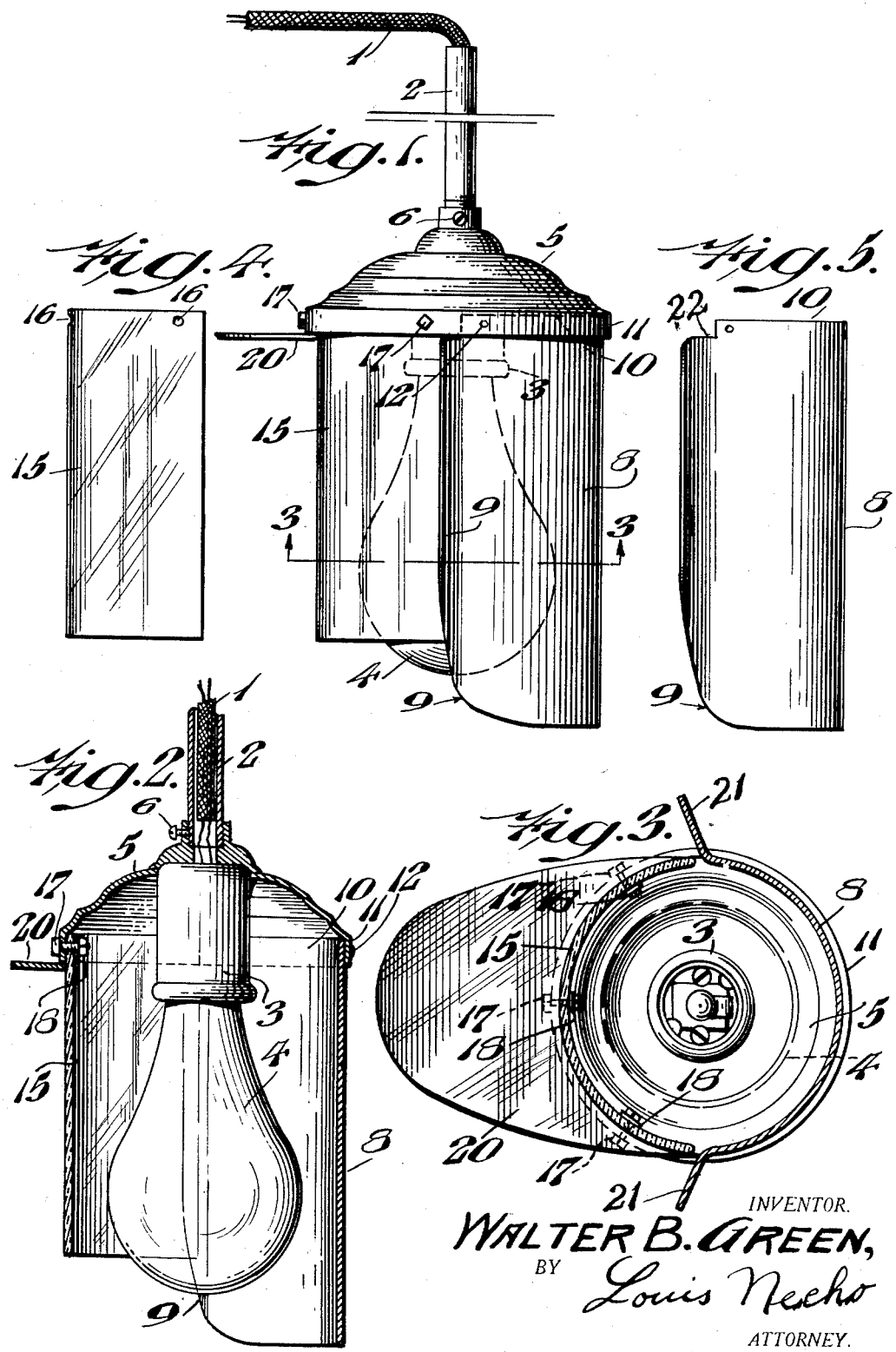
INVENTOR.
WALTER B. GREEN,
BY Louis Necho
ATTORNEY.

Patented Mar. 20, 1934

1,951,729

UNITED STATES PATENT OFFICE 1,951,729

COMBINED LIGHT AND REFLECTOR

Walter B. Green, Philadelphia, Pa., assignor of one-half to Samuel O. Hanna and one-half to William F. Baker, Philadelphia, Pa.

Application November 10, 1931, Serial No. 574,125

1 Claim. (Cl. 240—6)

My invention relates to a new and useful combined light and reflector particularly adapted for illuminating any desired locality and at the same time protecting the eyes of spectators from the glare.

My invention further relates to a device of this character which is adapted to increase the effectiveness or efficiency of a given light without increasing the current consumption.

As is well known in the lighting of display windows, the glare of the light and the reflection of the rays impinging on the plate glass seriously interferes with the vision, that is, with the ability of passers-by to see the merchandise on display in said window. To eliminate this disadvantage, various expedients have been resorted to, such as the use of awnings and the like, but in none of these cases was the result satisfactory and the use of such devices added to the expense of installation and upkeep.

Since the visibility of merchandise displayed in a window depends on the relative or comparative intensity of the light within and without the window, and also upon the comparative intensity of the rays of light which penetrate through the plate glass protecting said window, and the rays of light which are reflected from said plate glass towards the eyes of the spectator, it follows that to produce effective results it is necessary to direct rays of light of such intensity so that the rays of light reflected from the merchandise on display within the window will overcome the glare and reflection. It is the object of my invention to eliminate the glare and to intensify the rays of light falling on a display window or other locality to be illuminated so that all reflection from the plate glass of such window is overcome, thereby producing clear visibility without interference from reflected shadows or images, and without increase in current consumption.

To the above ends, my invention consists of a novel reflector of a size and contour to obscure the source of light from the eyes of spectators and passers-by, said reflector also serving to intensify and focus the rays emanating from said source of light upon the display window or other locality to be illuminated, thereby eliminating glare and reflection.

My invention further consists of a novel manner of securing said reflector to the source of light without necessitating any material change or alteration in the construction of the latter.

My invention further consists of the various novel features of construction and advantage hereinafter described and claimed.

For the purpose of illustrating my invention, I have shown in the accompanying drawing one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

In the accompanying drawing, Figure 1 represents a plan view in side elevation of a light provided with a reflector embodying my invention.

Figure 2 represents a vertical sectional view of Figure 1.

Figure 3 is a transverse sectional view on line 3—3 of Figure 1.

Figure 4 represents a side elevation of a glass shield seen in the left hand portion of Figure 1 shown detached.

Figure 5 represents a side elevation of the reflector seen in the right hand portion of Figure 1 shown detached.

Referring to the drawing in which like reference characters indicate like parts, 1 designates an electric wire passing through the conduit 2 into the conventional socket 3 which supports electric bulb 4. To the conduit 2 is secured the shell 5 by the set screw 6 in the usual manner. 8 designates a reflector embodying my invention which is of a greater length than the length of the bulb 4, so that its curved and somewhat tapered bottom end 9 extends below the bottom end of the bulb 4, as is apparent from Figures 1 and 2. The upper edge or rim 10 of the reflector 8 is adapted to fit within the bottom rim 11 of the shell 5 (see Figure 2) and is secured thereto, either by welding or by means of suitable bolts or rivets 12 passing through the upper edge 10 of the reflector 8 and the bottom rim 11 of the shell 5 or by any other suitable means. 15 designates a glass shield which is a semi-circular cross section (see Figure 3) and which is molded with the apertures 16 therein to receive the fastening bolts 17 which serve to secure it to that portion of the bottom rim 11 of the shell 5 which is not occupied by the reflector 8. In order to guard against possible breakage of the glass during the tightening of the bolts 17, I employ the washers 18, which are of felt or rubber or similar substance, to relieve the pressure on the glass reflector. 20 designates a horizontal reflector which is preferably of the contour shown in Figure 3, and which is secured to the bottom rim 11 of the shell 5 directly above the glass shield 15, the function of this reflector being to reflect downwardly any light rays passing through the glass shield 15 and traveling in a general upwardly direction, so as to prevent the waste of any light. The reflector 8 is provided with the outwardly flared side portions 21 which begin at the shoulder 22 in the upper edge 10 of the reflector and which taper downwardly and merge with the tapered bottom end 9 of the reflector, as will be understood from Figures 3 and 5.

Having thus described my invention, what I claim as new and desire to secure by Letters Patent is:

The combination with a light of an upper shell, a substantially semi-cylindrical pendant reflector open at its bottom end carried by said shell and having outwardly flared, downwardly tapering side portions, a translucent shield shorter than said reflector carried by said shell in a pendant position with the vertical edges thereof abutting against said outwardly flared side portions, and a horizontal reflector secured to said shell at the junction thereof with said translucent shield and extending outwardly from said shell.

WALTER B. GREEN.